2 Sheets-Sheet 1.
W. Trapp, Jr.
Dressing Stares.
No. 138.
Reissued Mar. 10, 1849.
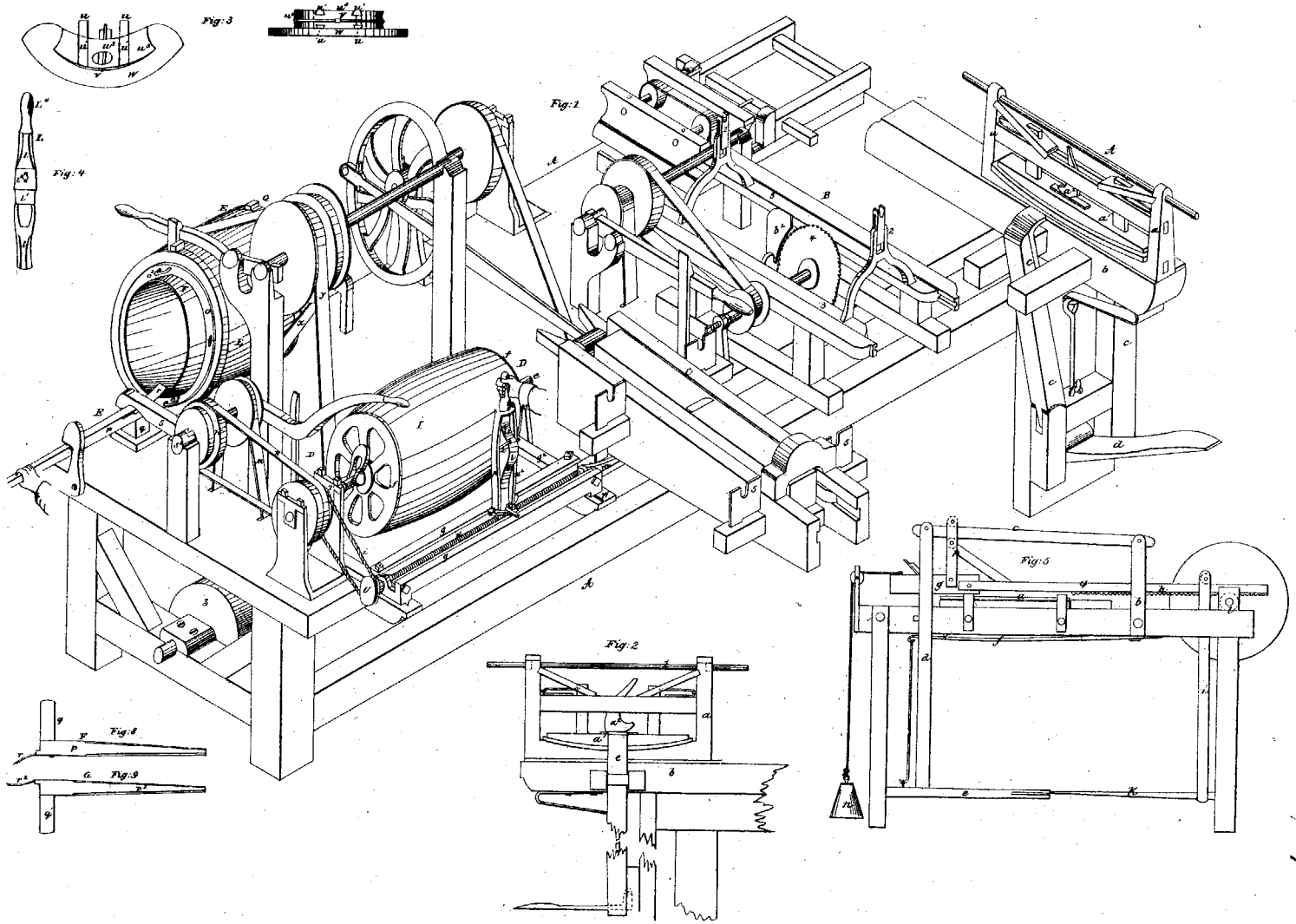
AM. PHOTO-LITHO. CO. N.Y. (OSBORNE'S PROCESS.)

2 Sheets-Sheet 2.
W. Trapp, Jr.
Dressing Staves.
No. 132. Reissued Mar. 10, 1849.
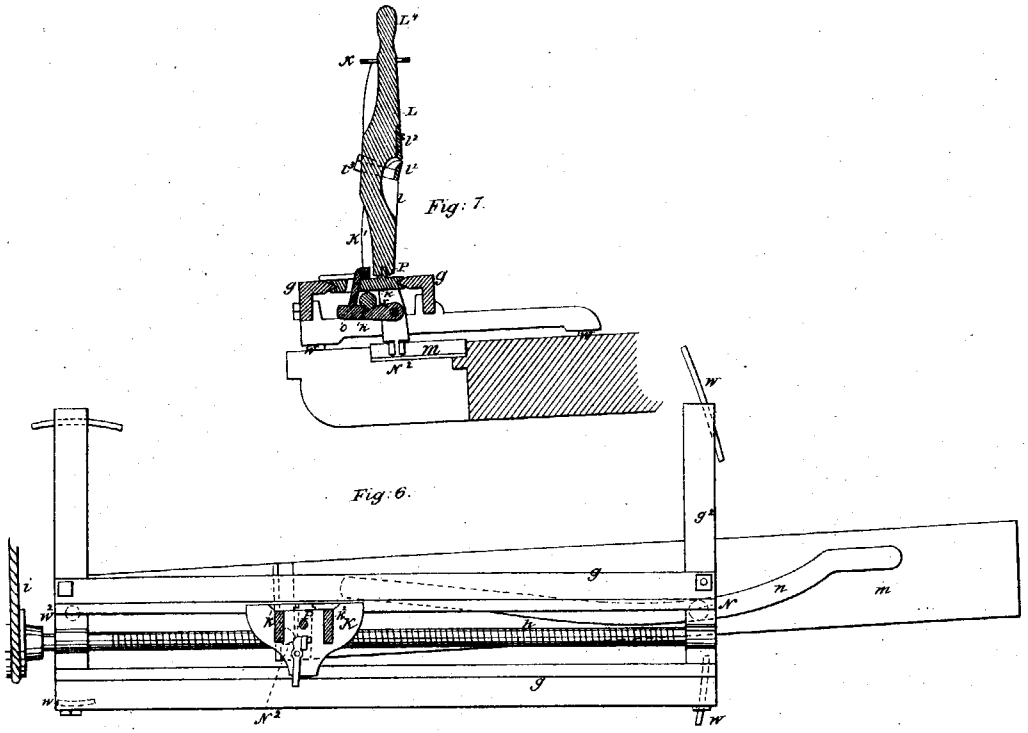
AM. PHOTO-LITHO. CO. N.Y. (OSBORNE'S PROCESS.)

UNITED STATES PATENT OFFICE.

WILLIAM TRAPP, JR., OF ITHACA, NEW YORK.

IMPROVEMENT IN BARREL MACHINERY.

Specification forming part of Letters Patent No. 4,218, dated October 1, 1845; Reissue No. 132, dated March 10, 1849.

*To all whom it may concern:*

Be it known that I, WILLIAM TRAPP, Jr., late of Dryden, but now of Ithaca, in the county of Tompkins and State of New York, and a citizen of the United States, have invented new and useful improvements for the manufacture of barrels of every size and description, as well as of other bilge or bulge work; and I do hereby declare that the following is a full, clear, and exact description thereof, reference being had to the annexed drawings of the same, making part of this specification, in which—

Figure 1 is an isometrical perspective view of all the machinery employed in the manufacture of the barrel or other bilge work. Fig. 2 is the concave bed swing-frame for bilging the staves. Fig. 3 represents a front and edge view of the crozing-tool, stock, and changeable face-plate. Fig. 4 is a front or face view of the tool for turning off the outside of the cask after it is placed in the machine for turning. Fig. 6 is a horizontal section of the ways, slide-rest, &c., for supporting and moving the last-mentioned tool in a direction to conform with the bilge of the barrel or other work. Fig. 7 is a vertical cross-section of the same. Fig. 8 is a side view of the chamfering-tool inverted. Fig. 9 is a side view of the howeling-tool.

Similar letters in the several figures refer to corresponding parts.

The frame A is made of sufficient capacity and strength to contain and support the several parts to be hereinafter described. After the staves have been sprung or bent and secured in the swing-frame *a*, Figs. 1 and 2, hereinafter more particularly described, and edged and jointed while in the swing-frame, they are then set up in the form of the barrel or other bilge work, and placed between two circular metallic heads, *f f*, attached to a mandrel, *e*, and secured to said heads by points projecting therefrom entering the ends of the staves, or secured in place by a shallow flange turned on said heads, fitting tightly around the ends of the staves. The mandrel is then placed in its bearings, as shown at D in Fig. 1, and is revolved by a band, R, leading from a pulley, H, on a shaft, $S^2$, to a pulley, J, on the mandrel, motion being given to the shaft $S^2$ by a band, M, leading from a drum, *z*, under the table, or from a pulley under the same. In front of the cask thus connected with the mandrel are arranged two parallel bars, *g g*, Figs. 1, 6, and 7, that serve as ways for a sliding rest, *k*, to travel on, being firmly joined together at each end and bolted to the frame at one end by a single bolt, $W^2$, Fig. 6, on which they move or slide, and resting on ways or rails W. Between these bars is arranged a screw, *h*, resting in boxes secured to the pieces connecting the extremities of the bars *g g* together, and turned by a band, *i*, leading from a pulley, T, on the mandrel *e* to a pulley, U, on the end of the screw *h*. A slide-rest, *k*, is placed between these bars *g g*, resting on the edges of the same, which is moved past the barrel over said bars by means of a divided nut, X, Fig. 7, resting on the screw, of the ordinary construction, and arranged so as to be detached therefrom at the will of the operator. Upon the slide-rest are erected two vertical standards, $k' k^2$, with a cap-piece, K, at the top having an oblong opening formed in it for the insertion of a tool and stock, L, between the said standards, the handle $L^4$ of said tool extending up through the said opening in the cap K for the operator to lay hold of, and the lower end having an opening in it into which is inserted a pin, P, projecting from the upper surface of the slide-rest *k*, upon which the tool rests and turns. This tool has its inner face represented at $l\, l'\, l^2$, Figs. 4 and 7, in which is inserted a cutter, $l'$, the face of which extends nearly the full distance across the face of the stock at right angles to the shanks $l^3$, Fig. 7, which shanks are inclined upward and fitted into recesses in the sides of the stock, and keyed fast by wedge-keys for holding the tool or cutter firmly in its proper position. Immediately above this cutter there is a gage or movable face-plate, $l^2$, that is kept close to the edge of the cutter $l'$, so as to form the throat of the tool and gage the thickness of the shaving to be taken off. The continuous shaving taken off by the said cutter is of the form of a parallelogram in its cross-section about one-third its width, the middle third being in the form of a thin wedge, the remaining third being prevented from touching the barrel; or, in other words, the cutter, as it moves along from one end of the barrel to the opposite end while the barrel revolves, is made to take a rank cut at the forward corner, and a thin feather-edge cut in the middle, and perform no cutting on the rear corner, thus causing the outer surface of the barrel to cut perfectly smooth. This form of chip or shaving taking from the surface of the barrel by the aforesaid straight-edged cutter is produced by the peculiar form of the face of the face-plate, which is filed away to a uniform depth one-third its width, as at $l^3$, Fig. 4, to produce the rank cut, the middle third being filed away in a sloping manner to produce the tapered portion of the shaving, as at $l^4$, Fig. 4. The pin P, on which the tool-stock L rests, holds the lower end of the stock in the required position, and allows the upper part, $L^4$, to turn and move toward or from the barrel, being guided by the slit in the cap K. By this means the tool can be guided and humored to the unequalities of the barrel, when it is not properly arranged in relation to the center between the heads of the mandrel, thus cutting the staves to one uniform thickness. To move the slide-rest *k* out as it approaches the bilge of the barrel, I attach a pattern, *m*, thereto, having a curved slit, *n*, therein, into which a pin, N, (represented by dotted lines in Fig. 6,) on the under side of the right-hand cross-bar, $g^2$, of the ways or bars *g* enters, and as this pattern *m* slides along with the rest *k* the ends of the ways *g* next the pattern *m* are carried out and in, following the work, their movements corresponding with the bilge of the barrel. This pin N is shown by dotted lines at N in Fig. 6. It has an anti-friction roller on it for reducing the friction between the rubbing-surfaces of the slit *n*. There is a similar pin, $N^2$, on the under side of the rest *k*, on which there is also an anti-friction roller, for traveling along the curved slit *n* of the pattern *m*, for guiding the tool, as represented at $N^2$ in Fig. 7 and by dotted lines in Fig. 6. Curved ways corresponding to the curve or bilge of the barrel are sometimes used for the slide-rest and tool to slide upon in dressing off the outside of the barrel. After the barrel I (as set up) has been turned off on the outside, as described, it is transferred to a hollow cylinder, E, turning in collars Q, attached to the bench, one at each end of the barrel, and is secured firmly therein by two ring-chucks, O, made to fit the taper of the barrel, and inserted in the ends of the cylinder E, between it and the cask I′, one of said ring-chucks being fixed stationary at one end of the cylinder, and the other formed to slide in and out between the cylinder and barrel. The barrel is placed in the cylinder E with its ends projecting beyond it, and the ring-chucks O are forced between it and the inner periphery of the cylinder, holding it firmly in its position. It is then put in motion by drum, bands, and pulleys, or by any convenient means.

The ring or chuck O in Fig. 1, above named, is divided on one side, and has two staples, $O^2$, driven into its end on opposite sides, for drawing it out when required. By being thus divided it can be driven in tight, and made to bind equally on the cylinder and barrel. The barrel may be used instead, and in place of the cylinder and for it, by fitting the ring-chucks to revolve within the collars Q Q. The tools for howeling and chamfering are then applied. These tools are shown at F and G, and the one for chamfering consists of a straight bar, *p*, having a foot or rest, *q*, projecting from it at right angles at one end, at which end the cutter *r* is affixed. This tool is applied as represented at F, Fig. 1, the knife being in contact with the chine of the barrel, and the foot *q*, resting on the bench, serving to hold the tool in a firm position during the operation, being also prevented from moving laterally by a hook, S, fastened to a standard in the bench, and brought down over the inner end. The outer end of the bar *p* is gradually raised during the operation, causing the knife to lower and cut the chine till said outer end of the bar *p* comes in contact with a projection formed on a hinged gage-bar, *t*, attached to the bench, which regulates the depth of the cut. The blade is shaped so as to form a curved cutter, with a straight shank inserted into the handle *p* and then secured by screws or other proper fastenings. Both edges are made sharp, so as to work at both ends of the barrel, and are above the upper surface of the handle, as represented in Figs. 1 and 8. In Fig. 8 the tool is represented in an inverted position when chamfering the barrel. The tool for howeling also consists of a straight bar, $p^2$, Fig. 9, serving as its handle, and a projection or foot, $p^3$, Fig. 9, serving as a rest or support for the tool during the operation of howeling, made in a similar manner to those of the chamfering-tool. The blade $r^2$ has two cutting-edges and a straight shank to be inserted into the handle, but its cutting-edges are below the upper surface of the handle, as represented at $r^2$ in Fig. 9, so as to be in a proper position for performing the required operation of howeling the barrel without the necessity of changing the apparatus *s t* for holding and gaging the tool, as described. The crozing-tool V, for cutting the croze, is formed in the usual manner, except in the particular of constructing the stock $u^3$, so that the face-plate can be changed from one side to the other, so as to make the crozing-tool work at either end of the barrel. For this purpose the stock is made alike on both faces, as represented at $u^3$, Fig. 3, having dovetailed grooves $u'$ cut into it to admit corresponding dovetailed ribs, *u*, formed on the face-plate *w*, by which construction the crozing-tool can be applied at either end of the barrel by simply turning the stock or the face-plate.

The nature of my most important improvement consists in the employment of the apparatus for springing and holding the stave in a frame having a concave bed, and swinging the same on a center or turning axle distant from the concave bed equal to the semi-diameter of the barrel which the staves are intended to form, and in the same plane with the revo v-ing circular saw which cuts off the edge of the staves, the swing-frame with concave bed and follower swinging in the arc of a circ e to either side of the saw, for the purpose of cutting both edges of the staves in succession, however wide or narrow they may be, at the same bevel corresponding with the radial lines drawn from the center on which the frame swings, or from the center of the barrel, which is of the same radius as that of the aforesaid concave bed, said swing-frame being also used to joint the staves successively on both edges after they shall have been listed or edged by the rotary circular saw.

The concave bed $a^4$, Fig. 2, of the swing-frame, into which the stave is sprung and secured, is made to conform to the required bilge of the barrel to be made. Above this concave bed $a^4$ is arranged a follower or platen, $a'$, of the same curve on the under side as the bed $a^4$. This follower is made to slide up and down between the bed $a^4$ and the girt $a^3$ or beam, and is employed to bend down the stave and hold it in the concave bed, said follower being held down by an eccentric lever, $a^2$, turning on a pin, $a^8$, inserted into the girt or beam $a^3$, arranged above the follower. The follower $a'$ is guided in its up and down movements by two parallel sliding guide-bars, $a^6$, secured firmly in the follower and moving loosely in mortises in the girt or beam $a^3$. To the upper ends of these bars $a^6$ are attached springs $a^7$, resting upon the beams, for the purpose of raising the follower and holding it up out of the way while removing and introducing staves to the bed. The bed $a^4$ and beam $a^3$ are mortised and tenoned into two parallel end timbers, which are extended above the beam to receive the center rod or axis, 1, on which the frame $a$ swings. The beam $a^3$ is braced by two inclined braces for resisting the spring of the stave. An eccentric, $a^2$, is connected to the middle of the beam $a^3$ by a round pin, $a^8$, on which it turns, for holding down the follower. A metallic plate, $a^5$, is secured to the middle of the top of the follower, against which the eccentric turns, and over which the hooks $c^2$ are placed while springing in the stave to the concave bed. The center metallic rod or axis, 1, is made with a screw at each end to receive nuts $a^9$, which are screwed firmly against the end timbers of the swing-frame, to form a tie and to resist the thrust of the braces. This swing-frame, however, may be made in any convenient way with either a concave or a convex bed. It is placed on a platform, $b$, attached to the bench, while springing in the stave, with its lower bar or bed-piece, $a^4$, resting on the said platform $b$, on each side of which is a vertical sliding rod, C, with a hook, $c^2$, formed on the upper end (one of said rods being jointed, so as to let the swing-frame $a$ in and out) below the platform $b$. The rods are joined together by a cross-piece, and connected with a treadle, $d$, below. The short arm of the treadle has an anti-friction roller on it, instead of a stationary fulcrum, which, as the treadle descends, is forced forward down an inclined plane or a curved way. (Shown by dotted lines in Fig. 2.) This arrangement gives great leverage and facility of operation. When the swing-frame is placed on the platform $b$, and a stave put into it under the follower $a'$, the hooks $c^2$ are closed over the edges of a plate, $a^5$, placed upon said follower, and forced downward, and the eccentric $a^2$ is then turned so as to hold it in that position. After it is edged and jointed it is again brought under the hooks $c^2$ and pressed down till the eccentric is loosened, and the stave is then taken out and replaced by another. The center rod or axis, 1, on which the frame $a$ swings, forms the center of the barrel or cask to be made. It is the same distance from the stave that the semi-diameter of the cask will be. This axis No. 1 rests in standards No. 2 in the apparatus B, Fig. 1, which are attached to a carriage, 3, which slides past a circular saw, 4, behind which there is a stationary wedge, $b^2$, for opening the kerf. This saw edges the bent stave on a radial line from the axis, after which the swing-frame is removed to a straight jointer, C, Fig. 1, the center rod or axis, 1, thereof resting in guides 5 on the sides of said jointer on a level with its face. The swing-frame is laid down first on one side and then on the other to joint the two edges of the stave. This operation will joint the two edges of the stave in straight lines, with the required bilge and bevel to form the barrel.

What I claim as my invention, and desire to secure by Letters Patent, is—

1. The combination of the slide-rest $k$, guided in the manner set forth, with the tool L, for turning off the cask, constructed and arranged in the manner set forth.

2. The apparatus for chamfering and howeling and crozing—that is to say, the combination of the cylinder E, open at both ends, so that both ends of the cask can be worked off without changing, with the ring-chucks O, for fastening the cask into the cylinder, and with the tools, as herein described, for chamfering and howeling.

3. The crozing-tool V, with the changeable face-plate $w$, as herein set forth.

4. The combination of the stock $l$, cutter $l'$, adjustable and gage plate $l^2$, constituting the tool for turning and smoothing the outside of the cask, as above described, and represented in Fig. 4.

5. The peculiar construction of the tool for howeling the cask, as above described, and represented at Fig. 9.

6. The peculiar construction of the tool for chamfering the ends of the cask, as above described, and represented in Fig. 8.

7. The mode of edging and jointing bilge-staves for making barrels and other bilge-work, by the employment of a swing-frame having a concave or convex bed in or against which the stave is sprung and secured to the required bilge, in combination with the revolving edging-saw and reciprocating straight-jointer, or either, whether the said swing-frame for confining the stave in its bent position and conveying it to the edging-saw and straight-jointer be constructed, arranged, and operated in the manner herein set forth, or in any o her mode or manner that may be substantially the same and by which analogous results shall be produced.

In testimony whereof I have hereunto signed my name before two subscribing witnesses.

WM. TRAPP, JR.

Witnesses:
WM. P. ELLIOT,
A. E. H. JOHNSON.